United States Patent

Chang et al.

Patent Number: 5,987,447
Date of Patent: Nov. 16, 1999

[54] METHOD AND APPARATUS FOR SEARCHING SENTENCES BY ANALYZING WORDS

[75] Inventors: Jackson Chang; Chaucer Chiu; Ha-Bi Ling, all of Taipei, Taiwan; Bob Bi, Peicning, China

[73] Assignee: Inventec Corporation, Taiwan

[21] Appl. No.: 08/859,427

[22] Filed: May 20, 1997

[51] Int. Cl.$^6$ .................................................. G06F 17/30
[52] U.S. Cl. .................. 707/3; 707/2; 707/4; 707/10; 707/104; 707/200
[58] Field of Search .................. 707/1, 2, 4, 104, 707/536, 3, 10; 704/3, 4, 5, 6, 9, 10, 200, 266, 277; 395/200.51, 200.66, 200.49, 500; 382/138; 370/220; 349/96; 701/200; 706/45

[56] References Cited

U.S. PATENT DOCUMENTS

| | | | |
|---|---|---|---|
| 4,644,492 | 2/1987 | Murata | 704/3 |
| 5,157,759 | 10/1992 | Bachenko | 704/266 |
| 5,208,897 | 5/1993 | Hutchins | 704/200 |
| 5,477,451 | 12/1995 | Brown | 704/9 |
| 5,541,838 | 7/1996 | Koyama | 704/4 |
| 5,768,603 | 6/1998 | Brown | 704/9 |

*Primary Examiner*—Paul R. Lintz
*Assistant Examiner*—Diane D. Mizrahi
*Attorney, Agent, or Firm*—Pillsbury Madison & Sutro LLP

[57] ABSTRACT

A method and an apparatus for searching sentences by analyzing words. The method arranges the expressive conceptual words of words in a sentence data base to establish a corresponding index table of conceptual words and sentences. Next, the conceptual words of words are arranged, namely, by performing the conceptual distinguishing of words to establish a corresponding index table of words and conceptual words. After a user inputs a word, many expressive conceptual words of the word are searched through the corresponding index table of words and conceptual words. After the user inputs an option signal to select an expectant conceptual word of the word, appropriate sentences are searched through the corresponding index table of conceptual words and sentences and a sentence data base. Using the above method, the present invention can effectively raise the ratio of hitting the target for searching an appropriate sentence, and increase the speed of searching sentence.

11 Claims, 8 Drawing Sheets

| The ID number of sentence | The content of sentence | The other information |
|---|---|---|
| 1 | Sentence 1 | ... ... |
| 2 | Sentence 2 | ... ... |
| 3 | Sentence 3 | ... ... |
| 4 | Sentence 4 | ... ... |
| 5 | Sentence 5 | ... ... |
| 6 | Sentence 6 | ... ... |
| ... | ... ... | ... ... |
| n | Sentence n | ... ... |

FIG.6

| The series number | Word | Conceptual word |
|---|---|---|
| 1 | Word W5 | Conceptual word N1 |
| 2 | Word W2 | Conceptual word N1 |
| 3 | Word W3 | Conceptual word N1 |
| 4 | Word W2 | Conceptual word N2 |
| ... | ... | ... |
| n | Word Wi | Conceptual word Nj |

FIG.7

| The ID number of word | Word |
|---|---|
| 1 | Word W1 |
| 2 | Word W2 |
| 3 | Word W3 |
| 4 | Word W4 |
| ... | ... |
| n | Word Wn |

FIG.8

| The ID number of conceptual word | Conceptual word |
|---|---|
| 1 | Conceptual word N1 |
| 2 | Conceptual word N2 |
| 3 | Conceptual word N3 |
| 4 | Conceptual word N4 |
| ... | ... |
| n | Conceptual word Nn |

FIG.9

| The series number | The ID number of word | The ID number of conceptual word |
|---|---|---|
| 1 | Word W1 | Conceptual word N1 |
| 2 | Word W2 | Conceptual word N6 |
| 3 | Word W2 | Conceptual word N12 |
| 4 | Word W3 | Conceptual word N5 |
| ... | ... | ... |
| n | Word Wi | Conceptual word Nj |

FIG.10

| The series number | Conceptual word | The ID number of sentence |
|---|---|---|
| 1 | Conceptual word N6 | Sentence S4 |
| 2 | Conceptual word N1 | Sentence S1 |
| 3 | Conceptual word N12 | Sentence S7 |
| 4 | Conceptual word N2 | Sentence S16 |
| ... | ... | ... |
| n | Conceptual word Ni | Sentence Sj |

FIG.11

| The series number | The ID number of conceptual word | The ID number of sentence |
|---|---|---|
| 1 | Conceptual word N1 | Sentence S1 |
| 2 | Conceptual word N2 | Sentence S16 |
| 3 | Conceptual word N3 | Sentence S8 |
| 4 | Conceptual word N4 | Sentence S15 |
| ... | ... | ... |
| n | Conceptual word Ni | Sentence Sj |

FIG.12

METHOD AND APPARATUS FOR SEARCHING SENTENCES BY ANALYZING WORDS

BACKGROUND OF THE INVENTION

1. Field of the Invention

The present invention relates to an apparatus and a method for searching sentences, and more particularly to an apparatus and a method of correctly analyzing a word and rapidly searching sentences.

2. Description of the Prior Art

The conventional method for searching sentences generally adopts an index table that is created using the corresponding relation of words and sentences according to every word in all sentences. After inputting a word, a sentence corresponding to the word is searched using this index table. This searching method usually finds a lot of unnecessary sentences, when the inputting word has multi-explanation (i.e., multi-conceptual word or multi-meaning).Therefore, the method lacks correctness and real effect. Generally speaking, when a word is input, a method of searching sentences by a computer is described according to some basic steps as follow:

1. Inputting a Chinese word, an English word, or the other language word to a computer.

2. Searching a sentence corresponding to the inputting word by an index table which is created using the corresponding relation of words and sentences.

Because a word in different sentences usually has multi-conceptual word in every language, a sentence is searched by a user that is possible not what the user really wants. For an example of a user inputting a word "Miss" to find a sentence expressing the meaning of giving thought to (a person), the user will obtain the result of searching sentence as follow:

"All right, I won't miss it for anything"

The outputting result will be improper.

Additionally, because a word with the same meaning can be replaced with a lot of similar meaning words, the other proper sentences having the similar meaning expressed using different words are always lost while searching a proper sentence. For example, a user inputs a word "tolerance" to search a sentence, and it is impossible that the user can search a sentence as follow:

"He can not brook being interfered with."

Accordingly, the conventional method for searching sentences can not effectively search a sentence which the user really wants to express the meaning of the inputting word, and it also can't have the function of searching a sentence having the similar conceptual word which is expressed with a plurality of similar meaning words. Therefore, the conventional searching method limits the development of the other searching functions.

SUMMARY OF THE INVENTION

It is a primary object of the present invention to provide an apparatus and a method for searching sentences by analyzing words. A user can rapidly and correctly search sentences that a user really wants to express the conceptual word of the inputting word (i.e., a user wants to express the really meaning of the inputting word).

It is another object of the present invention to provide an apparatus and a method for searching sentences by analyzing words. A user can find a lot of sentences having the similar meaning expressed by different expressive way that the inputting word is replaced with many similar conceptual words by distinguishing the conceptual word of the inputting word.

Accordingly, the present invention provides an apparatus and a method for searching sentences by analyzing words. The present invention adds a conceptual analyzing apparatus and a conceptual searching apparatus in the process of word searching sentence. A user can use the conceptual analyzing apparatus to perform the conceptual distinguishing of an inputting word, and then a sentence corresponding to the inputting word is searched through the conceptual searching apparatus. The present invention method comprises the steps as follow:

After a user inputs a word, the inputting word is performed the conceptual distinguishing through a conceptual distinguishing apparatus. Then an inputting word address is searched from a word data base. Next, the inputting word corresponds many conceptual words that express the meaning of the inputting word from the aim word concept data base, and then many conceptual word addresses are searched. Next, many conceptual words are searched from a concept data base, and then they are shown to the user. The user inputs a conceptual option signal to select one of conceptual words. Next, the selected conceptual word address is output to a conceptual searching apparatus to perform the search of sentence. The selected conceptual word corresponds to a sentence from the aim concept sentence data base, and then the sentence address is searched. Next, a correct sentence is searched from a sentence data base in accordance with the sentence address, and shown to the user.

BRIEF DESCRIPTION OF THE DRAWINGS

Various embodiments are described herein with reference to the drawings, wherein.

DESCRIPTION OF THE PREFERRED EMBODIMENT

A word typically has multi-explanation in different sentences in every language, namely, the word has multi-conceptual word (multi-meaning). Therefore, every word usually can express different conceptual words (different meanings). A sentence is consisted of many words, and every word in the sentence is only expressed with one conceptual word (one meaning). The present invention creates a conceptual analyzing apparatus and a conceptual searching apparatus in accordance with the above regularity. The conceptual word of a word is analyzed through the conceptual analyzing apparatus to distinguish a lot of different meanings of the word, and then a user input an optional signal to select the only meaning of the word (the only expressive conceptual word of the word). Next, a proper sentence corresponding to the conceptual word of the inputting word is obtained through the conceptual searching apparatus to perform the search of sentence.

Figure 1:
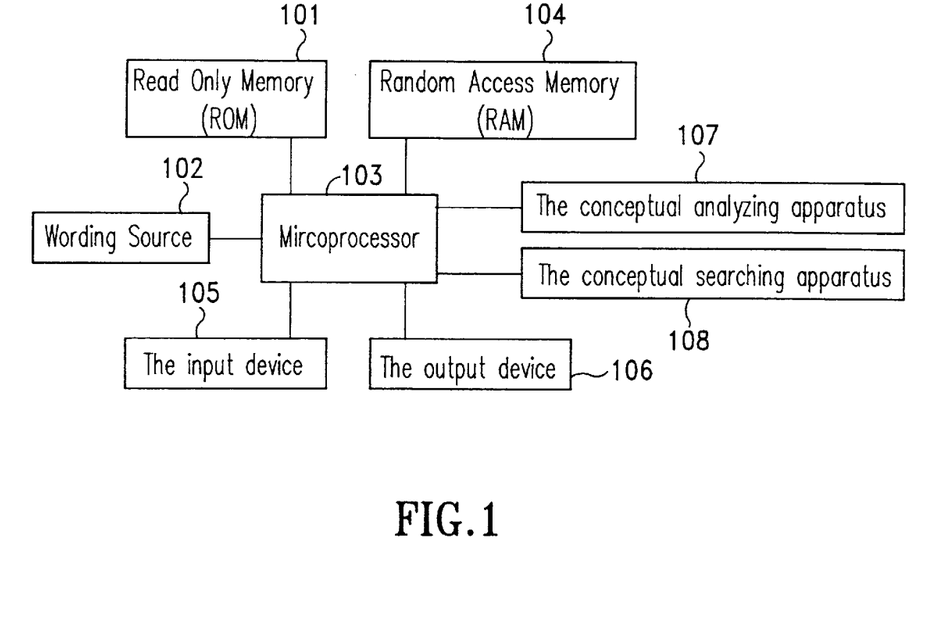
FIG. 1 is a diagram to establish a searching apparatus for searching sentences by analyzing word in accordance with the present invention method.

Referring first to FIG. 1, the structure of the present invention is illustrated. The structure comprises a Read Only Memory (ROM) 101 for storing the software programs, a word source 102 for providing content of searching words, a microprocessor 103 serving as the central control to arrange data of words, a Random Access Memory (RAM) 104 for storing and retrieving data of words, an input device 105 for inputting a word which a user expectantly searches and a conceptual option signal by the user, an output device 106 for showing a plurality of conceptual options and searched sentence corresponding to the conceptual of the inputting word to the user, a conceptual analyzing apparatus 107 for performing the conceptual distinguishing of the inputting word, a conceptual searching apparatus 108 for performing the search of sentence to obtain a sentence corresponding to the conceptual word of the inputting word in accordance with the distinguished conceptual word of the word.

The word source 102 provides content of searching words, and is analyzed and arranged again by the Microprocessor 103 dealing with data of words using the control of software programs storing in the Read Only Memory (ROM) 101. Next, the arranged data of words is stored into the Random Access Memory (RAM) 104 to create many relative data of words (e.g., a sentence data base, an original word concept data base, a word data base, a concept data base, an aim word concept data base, an original concept sentence data base, an aim concept sentence data base). The Random Access Memory (RAM) 104 serves as a data base of a computer to store many relative data of words, after the microprocessor 103 performs the operation of arranging content of data of words. While a user inputs a word through the input device 105, the inputting word is transferred to the conceptual analyzing apparatus 107 to distinguish the conceptual word of the inputting word. Then many conceptual words corresponding to the inputting word are shown to a user through the output device 106, and the user can select an appointed conceptual word through the input device 105. Next, the address of the appointed conceptual word is transferred to the conceptual searching apparatus 108 to perform the operation of searching appropriate sentences, and then an appropriate sentence is output to the user to accomplish the present intention.

Figure 6:
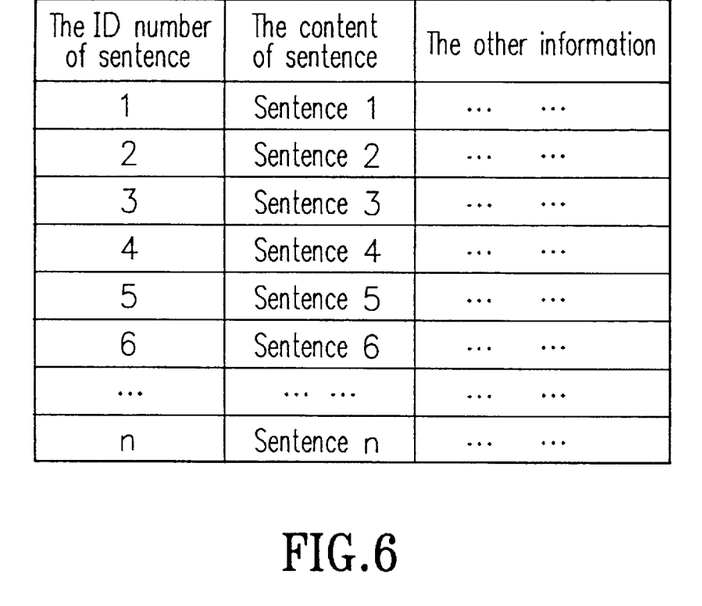
FIG. 6 is a diagram to create a sentence data base in accordance with the present invention method.
Figure 7:
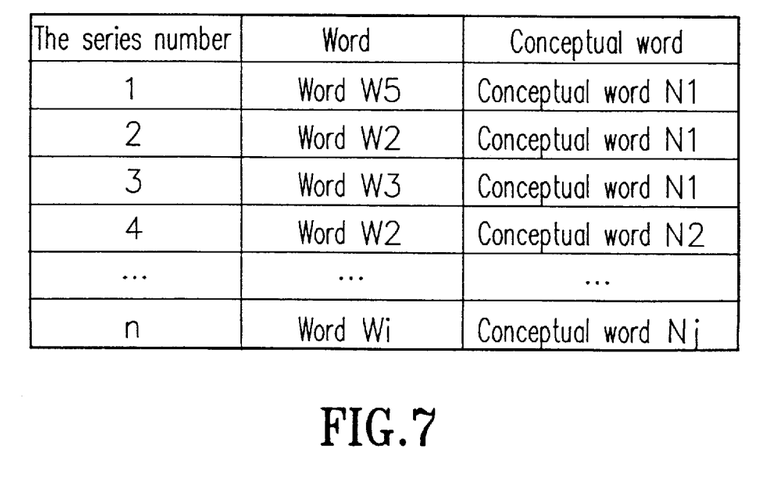
FIG. 7 is a diagram to create an original word concept data base in accordance with the present invention method.

The method for establishing the conceptual analyzing apparatus and the conceptual searching apparatus in accordance with the present invention is described as follows:

1. Sentences from a word source are stored into a data base of a computer to create a sentence data base that stores sentences, as illustrated in FIG. 6. Every word of sentences in the sentence data base can express many different conceptual words (different meanings). Therefore, after arranging these different conceptual words, they are distinguished to create a corresponding index table of words and conceptual words, which stores the relation of words and conceptual words. Next, the corresponding index table of words and conceptual words is stored to the data base of the computer to create an original word concept data base that stores the relation of words and conceptual words, as shown in FIG. 7 and the flow diagram of FIG. 5.

Figure 8:
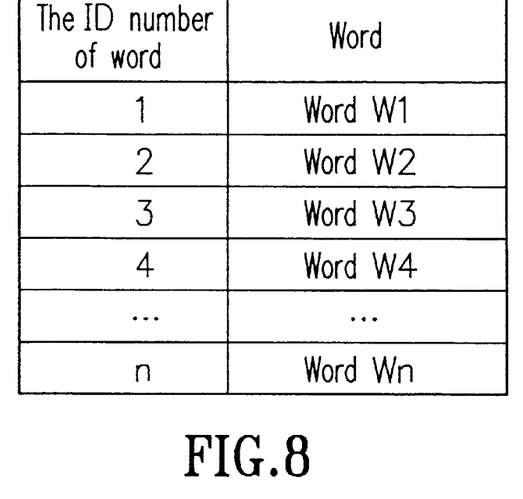
FIG. 8 is a diagram to create a word data base in accordance with the present invention method.
Figure 9:
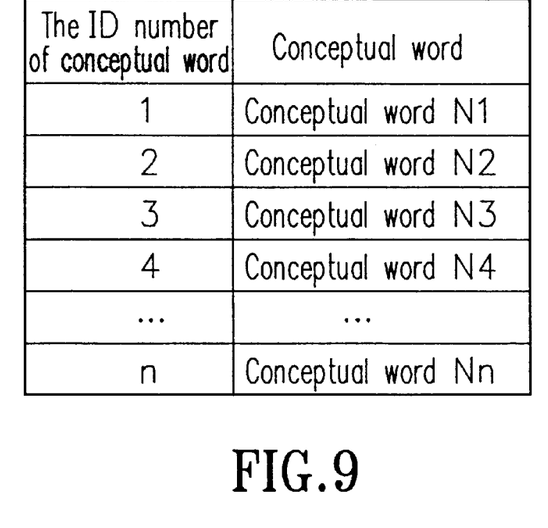
FIG. 9 is a diagram to create a concept data base in accordance with the present invention method.
Figure 10:
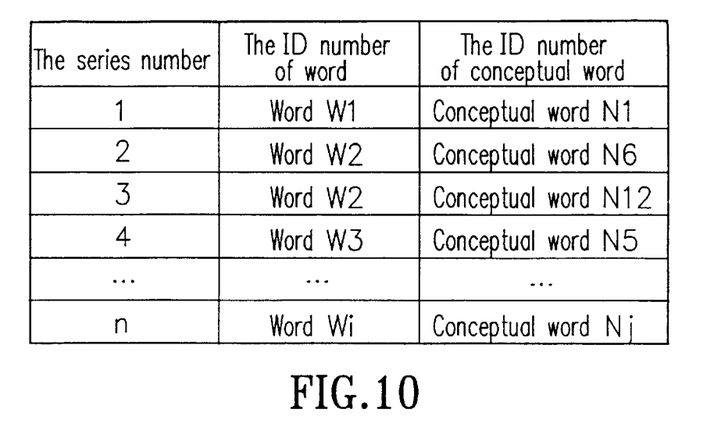
FIG. 10 is a diagram to create an aim word concept data base in accordance with the present invention method.

2. In accordance with the original word concept data base, words are arranged to create a word data base that stores words, as illustrated in FIG. 8, and conceptual words are arranged to create a concept data base that stores conceptual words, as illustrated in FIG. 9. Next, the ID numbers of words (word addresses) in the word data base are arranged, and refer to the original word concept data base and the concept data base by matching with the ID numbers of conceptual words (conceptual word addresses) in the concept data base to create an aim word concept data base that stores the relation of conceptual words and arranged words, as shown in FIG. 10.

3. A conceptual analyzing apparatus of the present invention is established through the aim word concept data base using the analyzing procedure of words to distinguish many concepts corresponding to an inputting word.

Figure 11:
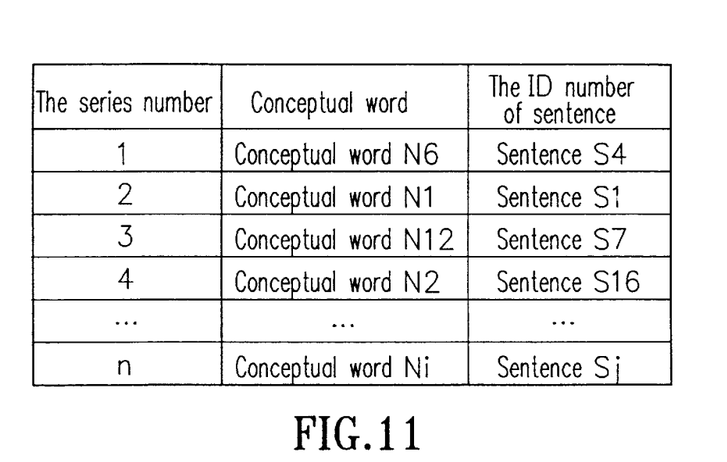
FIG. 11 is a diagram to create an original concept sentence data base in accordance with the present invention method.

4. Every sentence in the sentence data base is analyzed, and the expressive conceptual words of every word in sentences in the sentence data base are arranged. Next, in accordance with the concept data base, the corresponding index table of conceptual words and sentences is created, which stores the relation of conceptual words and sentences, and then it is stored to the data base of the computer to create an original concept sentence data base which stores the relation of conceptual words and sentences, as illustrated in FIG. 11 and the flow diagram of FIG. 3.

Figure 12:
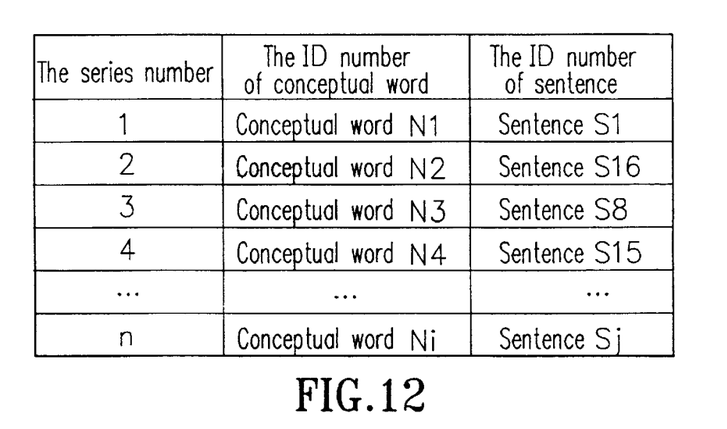
FIG. 12 is a diagram to create an aim concept sentence data base in accordance with the present invention method.

5. In accordance with the original concept sentence data base and the concept data base, the original concept sentence data base arranges the ID numbers of conceptual words (conceptual word addresses) of the concept data base to create an aim concept sentence data base which stores the relation of sentences and arranged conceptual words, as shown in FIG. 12.

6. A concept searching apparatus of the present invention is established through the aim concept sentence data base using the searching procedure of conceptual words to search a appropriate sentence corresponding to the expectant conceptual word.

Accordingly, the flow of setting up an original word concept data base is described in detail as follows.

Figure 2:
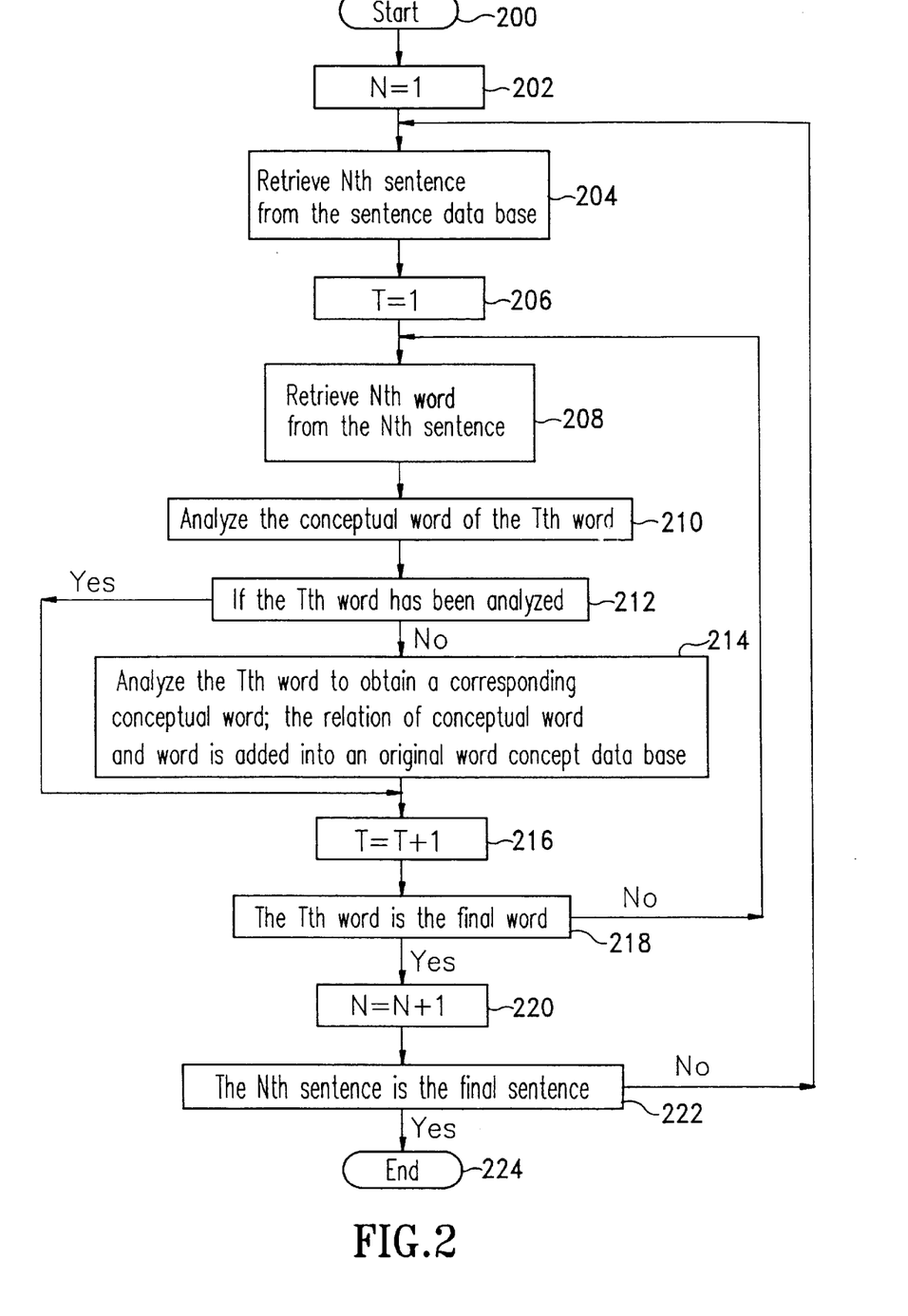
FIG. 2 is a flow diagram to create an original word concept data base in accordance with the present invention method.

Referring to FIG. 2, in a created sentence data base, sentences are retrieved in order from the sentence data base. At step 202 and step 204, the Nth sentence which series number N (N staring from 1) is retrieved from the sentence data base. Then, in accordance with the Nth sentence, every word in the Nth sentences is retrieved in series. As shown at step 206 and step 208, the Tth word that has series number T (T staring from 1) is retrieved from the Nth sentence. Next, the expressive conceptual word of the Tth word in the Nth sentence is analyzed at step 210. At decision step 212, the Tth word is checked whether it has been analyzed. If not, No branch is taken to step 214 and the Tth word is analyzed in step 214 to obtain a corresponding conceptual word. A group of corresponding relation of conceptual word and word is added into an original word concept data base. Then, at step 216 the series number of word is increased T=T+1. After step 212, if the result is yes, Yes branch is directly taken to step 216. Next, the Tth word is checked whether it is a final word at step 218. If not, No branch is taken to step 208, the program repeats step 208 to step 218 until all words in Nth sentence that the series number is N are completely analyzed. Next, at step 220 the series number of sentence is increased N=N+1. The sentence is checked whether it is a final sentence at step 222. If not, No branch is taken to step 204, the program repeats step 204 to step 222 until all sentences in the sentence data base are completely analyzed to establish an entire original word concept data base.

Additionally, the flow of setting up an original concept sentence data base is also described in detail as follows.

Figure 3:
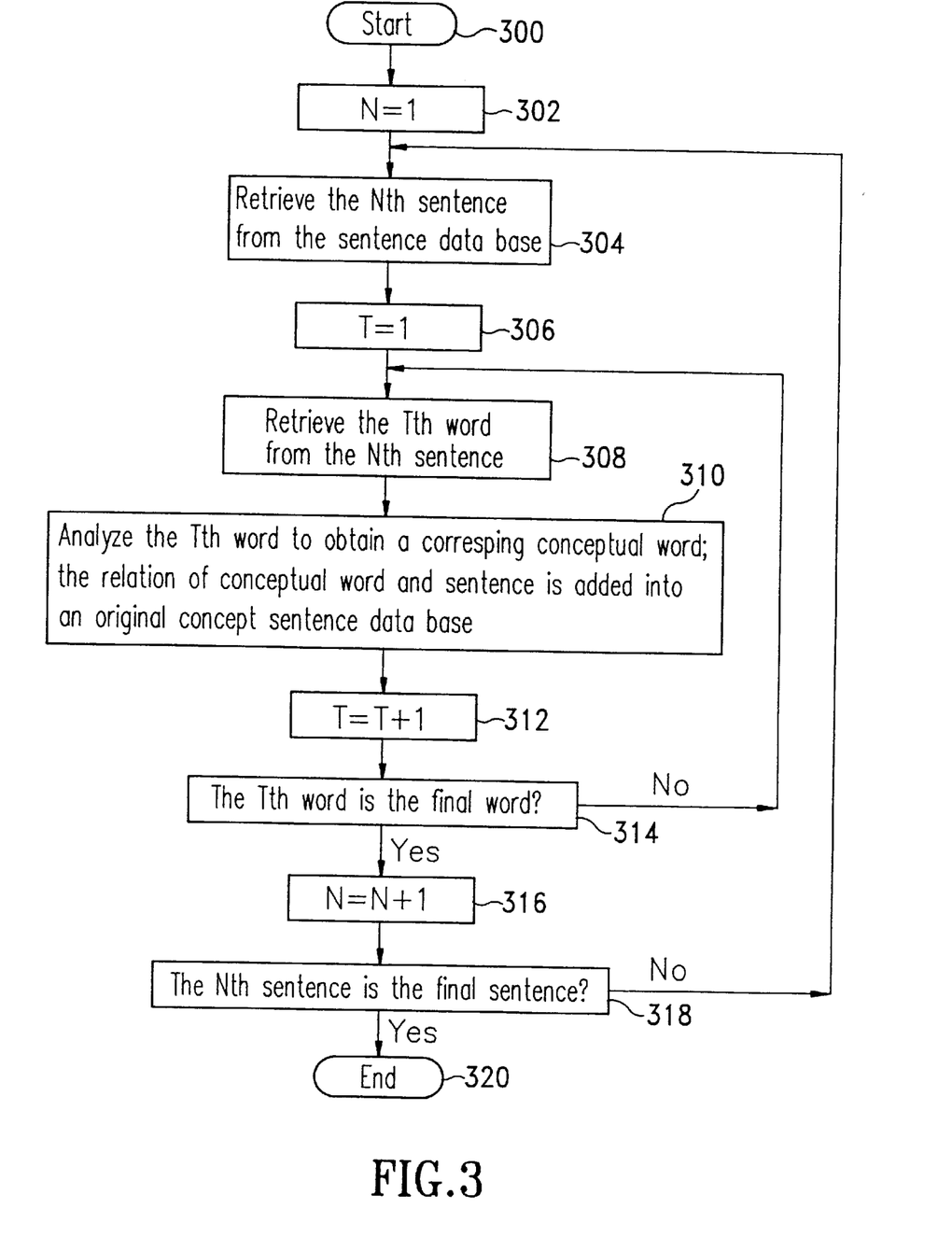
FIG. 3 is a flow diagram to create an original concept sentence data base in accordance with the present invention method.

Referring to FIG. 3, in a created sentence data base, sentences are retrieved in order from the sentence data base. At step 302 and step 304, the Nth sentence which has series number N (N staring from 1) is retrieved from the sentence data base. Then, in accordance with the Nth sentence, every word in the Nth sentences is retrieved in series. As shown at step 306 and step 308, the Tth word that has series number T (T staring from 1) is retrieved from the Nth sentence. Next, at step 310 the Tth word in the Nth sentence is analyzed to obtain a corresponding conceptual word in accordance with the concept data base as illustrated in FIG. 9. A group of corresponding relation of conceptual word and sentence is added into an original concept sentence data base. Next, at step 312 the series number of word is increased T=T+1. The Tth word is checked whether it is a final word at step 314. If not, No branch is taken to step 308, the program repeats step 308 to step 314 until all words in Nth sentence that the series number is N are completely analyzed. Then, at step 316 the series number of sentence is increased N=N+1. The sentence is checked whether it is a final sentence at step 318. If not, N branch is taken to step 304, the program repeats step 304 to step 318 until all sentences in the sentence data base are completely analyzed to establish an entire original concept sentence data base.

Figure 4:
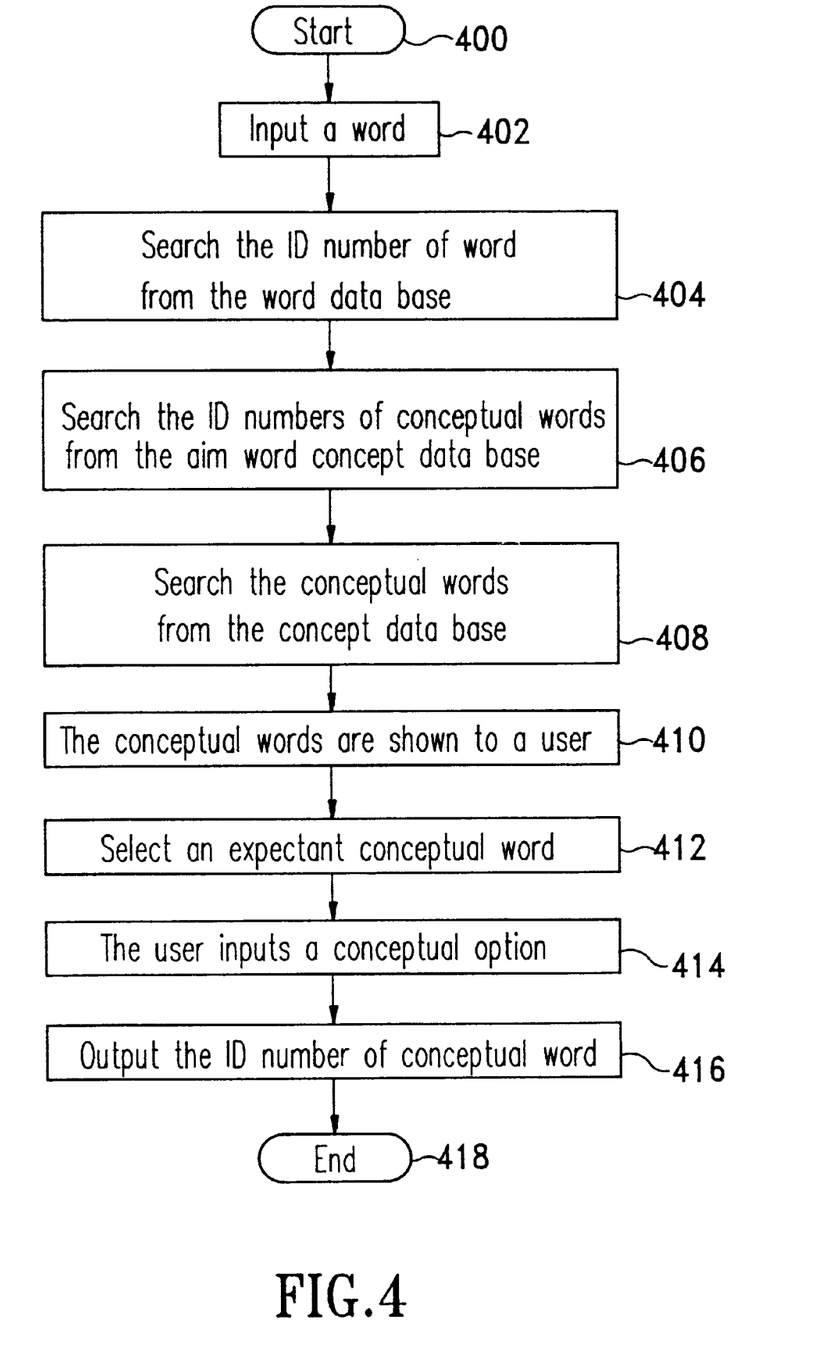
FIG. 4 is a flow diagram to analyze the conceptual word through a conceptual analyzing procedure in accordance with the present invention method.

Referring next to FIG. 4, is a flow diagram to perform the concept analyzing through a conceptual analyzing procedure in accordance with the present invention method. At step 402 an expectant searched word is inputted through an input device by a user, and the word is transferred to a conceptual analyzing apparatus to perform the conceptual distinguishing through a microprocessor. At step 404, the word is searched from the word data base as shown in FIG. 8, where words are arranged in order, using binary search or other search methods through a microprocessor. Then, a corresponding ID number of word is obtained. At step 406, in accordance with the searched ID number of word, ID numbers of conceptual words corresponding to the word are searched from the aim word concept data base as shown in FIG. 10, where words are arranged in order, using binary search or other search methods. Next, at step 408, in accordance with the searched ID numbers of conceptual words, the conceptual words corresponding to the ID numbers of conceptual words are searched from the concept data base as shown in FIG. 9. At step 410, the conceptual words are shown to a user using the method of list or other expressive methods through an output device. At step 412, the user is requested to selected an expectant searching conceptual word of the word. At step 414, the user inputs a conceptual option signal through an input device to select an appropriate meaning of the inputting word. Then, the procedure of performing the conceptual distinguishing is completed, and at step 416 the result of the selected ID number of conceptual word is transferred to a conceptual searching apparatus to perform the search of appropriate sentences.

Figure 5:
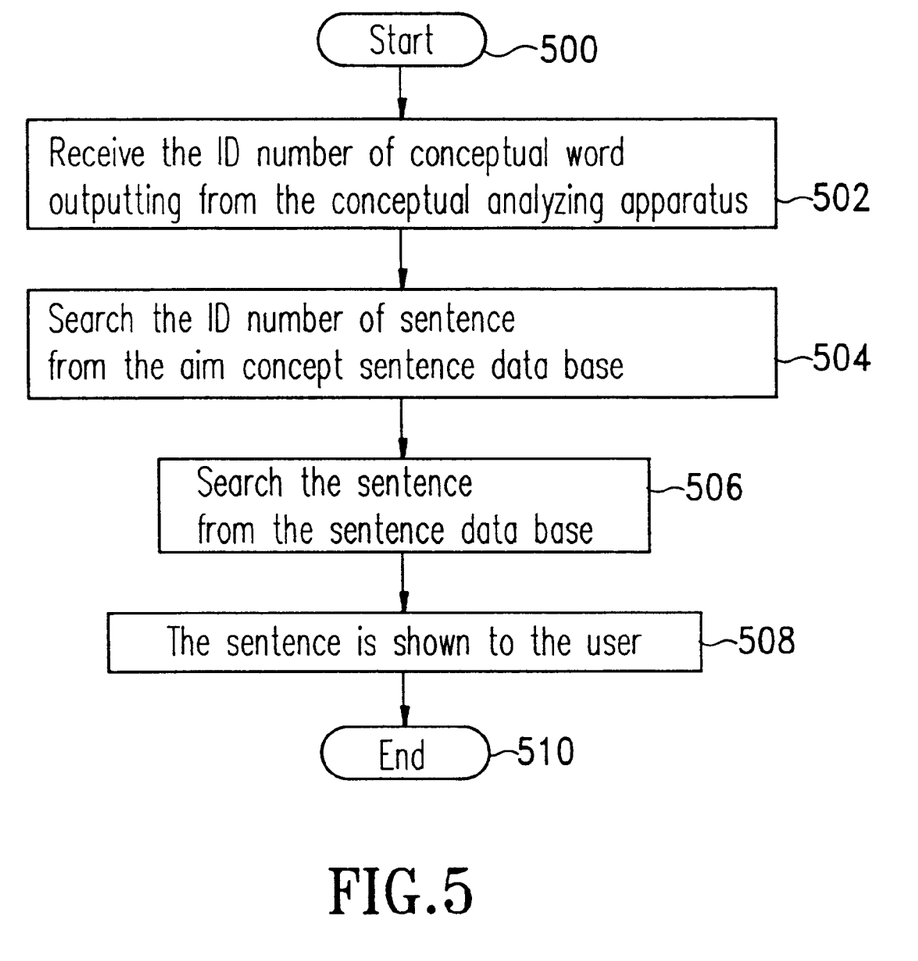
FIG. 5 is a flow diagram to search the sentence through a conceptual searching procedure in accordance with the present invention method.

Referring next to FIG. 5, it is a flow diagram to perform the sentence search through a conceptual searching procedure in accordance with the present invention method. At step 502, the ID numbers of conceptual words are received from the conceptual analyzing apparatus. At step 504, the ID numbers of sentences corresponding to the selected conceptual word are searched from the aim concept sentence data base as shown in FIG. 12, where conceptual words are arranged in order, using binary search or other search methods through a microprocessor. At step 506, the sentences corresponding to the conceptual word are retrieved from the sentence data base as shown in FIG. 6 in accordance with the ID numbers of sentences. At step 508, the searched sentences are shown to the user through the output device. Then, the procedure of performing the operation of searching appropriate sentences is completed.

According the above technique, there is an example, which is described in detail as follow:

In this example, a sentence "They elected Green to the Academy" is searched. When a user inputs a word "elect", which is then transferred to a conceptual analyzing apparatus. The ID number of word (word address)is obtained by searching the word data base. Next, there are two ID numbers of conceptual words (conceptual word addresses) "K an K+1" obtained by searching the aim word concept data base. Next, the corresponding conceptual words are obtained through the concept data base.

| the series number | word | conceptual word |
| --- | --- | --- |
| k−2 | educate | develop ; form ; cultivate ; elevate |
| k−1 | educate | teach ; educate ; instruct ; tutor |
| k • | elect | select ; choose ; pick |
| k+1 • | elect | elect ; vote ; choose ; return |
| k+2 | elongate | spread ; extend ; stretch ; reach |

The searched two conceptual words are shown to the user, and then the user is required to select an expectant conceptual word.

| Please select an expectant conceptual word: | ? X |
| --- | --- |
|    select ; choose ; pick | |
| • elect ; vote ; choose ; return | |

If the user selects the conceptual words of "elect; vote; choose; return", the conceptual analyzing apparatus transfers the corresponding ID number of conceptual word (conceptual word address) "K+1" to the conceptual searching apparatus. The conceptual searching apparatus searches a group of sentences through the aim concept sentence data base. Next, the content of the corresponding sentences is searched through the sentence data base. Finally, they are shown to the user by the output device.

| |
| --- |
| They elected John to the Academy. |
| They chose me as their representative. |
| • They chose Green to the Academy. |
| People chose him to be their leader. |
| The representatives returned her to the senate. |
| All the representatives chose Mr. Jiang Chairman. |

The third sentence shown above reads "They chose Green to the Academy.". Although the word is different from the original expectant searching sentence, the meaning is the same. Therefore, the appropriate sentence is searched.

However, if using the conventional searching method, it is difficult to find such a sentence. Accordingly, the present invention can raise the ratio of hitting the target for searching an appropriate sentence, and increase the speed of searching sentence.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A language aid method for identifying sentences related to an input source word using a processor-based apparatus to generate a plurality of target sentences with the desired meaning, the method comprising the steps of:

inputting the source word through an input device of the processor-based apparatus;

first searching a first database to find a plurality of candidate synonyms corresponding to the source word;

selecting a set of desired synonyms from the candidate synonyms;

second searching a second database containing target sentences and locating a set of the target sentences corresponding to the selected set of desired synonyms; and displaying the target sentences.

2. The method according to claim 1 wherein the first searching step comprises the steps of:

searching a third database in accordance with the source word to find a corresponding source word address;

searching a fourth database in accordance with the source word address to locate candidate synonym addresses; and searching a fifth database in accordance with the candidate synonym addresses to locate the candidate synonyms;

wherein the third, fourth, and fifth databases may be included in the first database.

3. The method according to claim 1, wherein the second searching step comprises the steps of:

searching a sixth database in accordance with addresses of the desired synonyms to locate target sentence addresses; and searching a seventh database in accordance with the target sentence addresses to locate target sentences;

wherein the sixth and seventh database may be included in the second database.

4. The method according to claim 1, wherein the desired synonyms are determined by inputting an option signal to select a desired meaning from a group of meanings of candidate synonyms.

5. A language aid method for searching sentences related to a desired meaning of an input source word in a particular language using a processor-based apparatus to generate a plurality of target sentences with the desired meaning in the same language, the method comprising the steps of:

inputting the source word through an input device of the processor-based apparatus;

searching a first database in accordance with the source word to locate a source word address;

searching a second database in accordance with the source word address to locate a plurality of candidate synonym addresses indicative of every synonymous meaning of the source word stored in the second database;

searching a third database in accordance with the candidate synonym addresses for locating candidate synonyms;

selecting a set of desired synonyms from the candidate synonyms by using the input device;

searching a fourth database in accordance with addresses of the desired synonyms for locating a plurality of target sentence addresses;

searching a fifth database in accordance with the target sentence addresses for providing the target sentences; and outputting the target sentences to an output device of processor-based apparatus.

6. An apparatus for providing target sentences in a particular language related to an input source phrase in the same language, the target sentences being relevant to a desired meaning of the source phrase, the apparatus comprising:

first memory means for storing a program controlling the apparatus;

word source means for providing a source sentence;

processing means, responsive to the word source means, by utilizing the program, for analyzing and dividing the source sentence into a plurality of candidate phrases in accordance with a structure of the sentence;

second memory means for storing and retrieving data generated by the processing means while analyzing the source sentence;

an input device for inputting data into the apparatus;

conceptual analyzing means, responsive to the source phrase selected from the candidate phrases, for providing a plurality of candidate meanings of the source phrase;

conceptual searching means, responsive to a desired meaning selected from the candidate meanings, for generating the target sentences expressing various examples of the desired meaning of the source phrase; and an output device for displaying information of the apparatus, thereby the target sentences are shown on the output device.

7. The apparatus according to claim 6, wherein the conceptual searching means comprises:

a sixth database for storing information which is searched in accordance with relations between the example meanings and addresses of the example sentences; and a seventh database for storing information which is searched in accordance with relations between the example sentence addresses and the example sentences.

8. The apparatus according to claim 7, wherein the conceptual searching means responsive to the desired meanings searches the sixth database to generate addresses of the target sentences, and continuously searches the seventh database to provide the target sentences.

9. The apparatus according to claim 8, wherein the conceptual analyzing means determines the desired meaning from the candidate meanings through a selection of the input device.

10. The apparatus according to claim 6, wherein the conceptual analyzing means comprises:

a first database for storing a plurality of example sentences;

a second database for storing information which is searched in accordance with relations between a plurality of example meanings, which are distinguished from the example sentences by analyzing structure of sentence, and corresponding example phrases, thereby mapping one of the example meanings to some of the corresponding example phrases;

a third database for storing information which is searched in accordance with relations between the example phrases and addresses of the example phrases, the example phrases stored in the third database being rearranged in order;

a fourth database for storing information which is searched in accordance with relations between the example meanings and addresses of the example meanings, the example meanings being rearranged in order; and a fifth database for storing information which is searched in accordance with relations between the example phrase addresses and the example meaning addresses, in which the example meaning addresses are sorted in a order of the corresponding example phrase addresses.

11. The apparatus according to claim 10, further comprising means for receiving the desired phrase through the input device and generating the candidate meanings for the conceptual analyzing means, the receiving means comprising:

means for searching the third database for providing a address respective to the desired phrase;

means for searching the fifth database for providing a plurality of candidate meaning addresses respective to the desired phrase address, according to the desired phrase address; and means for searching the fourth database for providing a plurality of the candidate meanings, according to the candidate meaning addresses.

* * * * *